J. T. FANNING.
Pump.
No. 208,301. Patented Sept. 24, 1878.
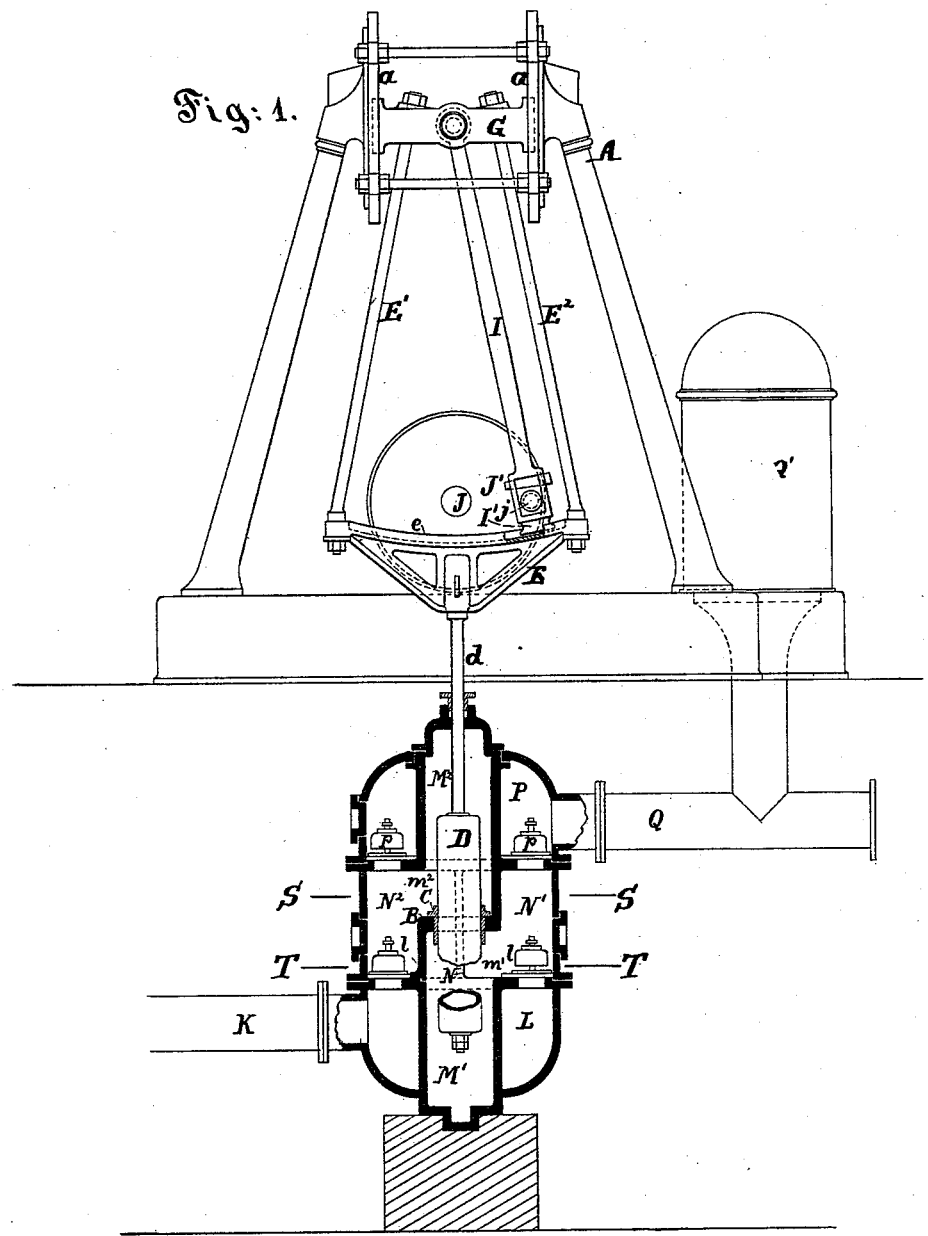
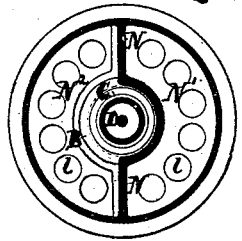
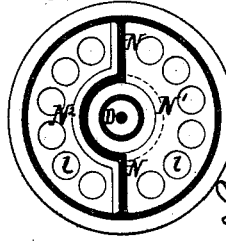

UNITED STATES PATENT OFFICE.

JOHN T. FANNING, OF MANCHESTER, NEW HAMPSHIRE.

IMPROVEMENT IN PUMPS.

Specification forming part of Letters Patent No. 208,301, dated September 24, 1878; application filed March 20, 1878.

*To all whom it may concern:*

Be it known that I, JOHN T. FANNING, of Manchester, Hillsborough county, in the State of New Hampshire, have invented certain new and useful Improvements Relating to Pumps, of which the following is a specification:

My invention is intended more particularly for large and moderately-worked pumps employed for the supply of towns and cities, but it may be used with some advantage of smaller size. It is adapted for miscellaneous work.

It is a vertical double-acting plunger-pump. The plunger operates through a packing or close-fitting stationary part, which performs its usual functions. The dividing apparatus and consequently the chambers are peculiarly arranged.

The following is a description of what I consider the best means of carrying out the invention.

The accompanying drawings form a part of this specification.

Figure 1 is an elevation, partly in section. Fig. 2 is a section on the line S S in Fig. 1. Fig. 3 is a section on the line T T in Fig. 1.

Similar letters of reference indicate like parts in all the figures.

D is my double plunger, a casting preferably hollow and perfectly cylindrical on its exterior. It is connected by a plunger-rod, $d$, to a cross-piece, E, which, with the inclined rods $E^1 E^2$, forms a yoke, connecting it to a cross-head, G, running in guides $a$ on the fixed framing A.

I is the connecting-rod, pivoted at its upper end to the cross-head G, and at its lower end to the crank-pin $j$, fixed on the crank-disk $J'$ of the shaft J. To this shaft a rotary motion is communicated from a steam-engine or other convenient power.

The lower end of the connecting-rod I is extended and widened, as indicated by I'. As the crank $j$ revolves, and the connecting-rod I vibrates from side to side, the extension I' of the connecting-rod plays from side to side in a smooth groove, $e$, in the upper side of the cross-piece E. The shaft J being firmly held against end play by suitable collars, and the union of the connecting-rod I with the crank-pin $j$ being similarly formed, the extension I' of the connecting-rod I, by matching closely in the groove $e$, serves as a guide to support the plunger-rod $d$ and the framing E $E^1 E^2$ against lateral vibration. It compels the frame E and its adjuncts to move up and down in a uniform plane.

My plunger works vertically in immediately surrounding plunger-chambers of sufficient area to allow the water to move freely without choking, while the valves are arranged at a greater distance in annular series. The valves are of the puppet variety. The induction-valves $l$ and the delivery-valves $p$ are each in two semicircular series, apportioned to the alternate strokes of the pump.

A stuffing-box or exchangeable brass, C, through which the plunger D moves, is held in a small annular ring, B, which with reference to its horizontal position I will designate a "flooring." It makes a horizontal division in the plunger-chambers $M^2 M^1$, extending continuously from the top to the bottom of the pump-body, except for two liberal openings, one, $m^2$, opening into one side of the upper chamber, $M^2$, and another, $m^1$, opening into the opposite side of the lower chamber, $M^1$. These apertures $m^1 m^2$ communicate, respectively, with semi-annular chambers $N^1 N^2$, which together inclose the central parts, and are separated from each other by a plane vertical web or partition, N. The semi-annular chamber $N^1$ being in free communication through the aperture $m^1$ with the lower plunger-chamber, $M^1$, each ascent of the plunger D inducts water through its series of induction-valves $l$ from an annular chamber, L, below, which is in communication with the induction-pipe K; and each descent of the plunger D, by reducing the capacity of the connected chambers $M^1 N^1$, causes their induction-valves $l$ to close, and delivers the water upward through eduction-valves into an annular chamber, P, above, which is in free communication with the delivery-pipe Q, provided with a proper air-chamber, Q'.

A corresponding effect is induced by the rise and descent of the plunger D in the upper plunger-chamber, $M^2$, and its connected semi-annular chamber $N^2$. Each descent of the plunger D enlarges the capacity of the connected chambers $M^2 N^2$, and inducts water through its induction-valves $l$, arranged in the semi-annular base of the latter chamber, and each ascent of the plunger D, by reducing the capacity of the same connected chambers, drives out the water through a corresponding series of delivery-valves, $p$, above.

My arrangement is highly favorable to compactness of construction, moderate strain or wear on all the parts, ease of access to all the parts, and liberal valve-space and easy motion of the water. Each descent of the plunger forces out from the chamber $m^1$ the volume of water displaced by the descent of the plunger. The same motion draws into the chamber $m^2$ a nearly equal volume. It is the same, except for the slight reduction due to the presence of the plunger-rod $d$. Each ascent of the plunger D displaces the water from the chamber $m^2$, and forces it out through the delivery-valves, while it inducts into the chamber $M^1$ the corresponding and slightly greater quantity by the rise of the plunger and the consequent enlargement of the space which practically belongs to that chamber.

I can construct the fixed parts in a greater or less number of separate pieces, strongly and tightly united. It is important to provide not only for access to the valve-seats to finish them smoothly, but also for access to the valves when required to inspect or repair them. What I esteem the preferable construction of all the parts is shown in the drawings, where the metal inclosing the annular chamber L and the lower end of the plunger-chamber $M^1$ is in one casting. The chambers $M^1$ $M^2$, the upper end of the lower plunger-chamber, $M^1$, and the whole of the upper plunger-chamber, $M^2$, are in a second casting, with liberal hand-holes and bonnets; and the outer wall and top of the upper chamber, P, is a third casting, with hand-holes and bonnets.

It is important that there be a removable bonnet over the top plunger-chamber. This is of obvious use in inserting and removing the plunger, and by lifting it and lowering the plunger and plunger-rod access any time can be obtained to the packing-ring of brass, C.

It will be observed that the central piece, B, with the adjacent portions of the fixed work—to wit, the lip or curved wall rising from its edge on one side, and dropping from its edge on the other side—constitute a continuous and peculiarly-bent partition, and that this partition is continued outward by the plane extensions which separate the semi-annular chambers $N^1$ $N^2$. This peculiarly-bent partition is strong and continuous. It effectually divides the water which is worked in the system of passages by one end of the plunger from the water which is worked in the system of passages by the other end of the plunger, and renders practicable the compact arrangement of the whole.

Modifications may be made. Instead of puppet-valves for the induction and eduction, any other form of self-acting, or even mechanically-worked, valves may be employed. A vacuum-chamber may be applied on the induction-pipe K, and all the ordinary or extraordinary provisions for lubricating, inspecting, &c., may be made available.

I claim as my invention—

1. In a vertical double-acting plunger-pump, the plunger-chambers $M^1$ $M^2$, passages $m^1$ $m^2$, and connected semi-annular chambers $N^1$ $N^2$, with suitable induction-valves and connected passages, combined and arranged to operate as herein specified.

2. In a vertical double-acting plunger-pump, the annular inlet-chamber L and annular delivery-chamber P, in combination with the connected chambers $M^1$ $N^1$ $M^2$ $N^2$ and suitable controlling-valves, as and for the purposes herein specified.

3. The combination of the plunger D, plunger-rod $d$, yoke E $E^1$ $E^2$, cross-head G, and connecting-rod I, communicating power from the crank J', as and for the purposes herein specified.

4. The extension I' of the connecting-rod I, vibrating in the groove $e$ in the cross-frame E, in combination with the plunger-rod $d$ and plunger D, as and for the purposes herein specified.

In testimony whereof I have hereunto set my name in presence of two subscribing witnesses.

JOHN T. FANNING.

Witnesses:
A. H. GENTNER,
H. A. JOHNSTONE.